(12) United States Patent
Mangione (10) Patent No.: US 11,294,833 B2
(45) Date of Patent: Apr. 5, 2022

(54) EXCHANGE OF DATA WITHIN A DYNAMIC TRANSPONDER, AND CORRESPONDING TRANSPONDER

(71) Applicant: STMicroelectronics (Rousset) SAS, Rousset (FR)

(72) Inventor: Jose Mangione, Mougins (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 16/853,000

(22) Filed: Apr. 20, 2020

(65) Prior Publication Data

US 2020/0341917 A1     Oct. 29, 2020

(51) Int. Cl.
*G06F 13/16* (2006.01)
*G06F 13/42* (2006.01)
*G06K 19/07* (2006.01)

(52) U.S. Cl.
CPC ...... *G06F 13/1668* (2013.01); *G06F 13/4282* (2013.01); *G06F 2213/0016* (2013.01); *G06K 19/0723* (2013.01)

(58) Field of Classification Search
CPC ............ G06F 13/1668; G06F 3/4282; G06F 13/4282; H04B 5/0031; H04B 1/59
See application file for complete search history.

(56) References Cited

U.S. PATENT DOCUMENTS

| | | | | |
|---|---|---|---|---|
| 6,564,267 | B1 * | 5/2003 | Lindsay | H04L 29/06 370/465 |
| 2008/0231428 | A1 * | 9/2008 | Kuhl | G06Q 20/045 340/10.51 |
| 2015/0235059 | A1 * | 8/2015 | Patange | G06K 7/10009 340/10.1 |
| 2015/0311957 | A1 * | 10/2015 | Dube | H04B 5/0031 455/41.1 |
| 2016/0057070 | A1 * | 2/2016 | Saxena | H04L 47/628 370/392 |

(Continued)

FOREIGN PATENT DOCUMENTS

| | | |
|---|---|---|
| CN | 1719459 A | 1/2006 |
| CN | 1942882 A | 4/2007 |
| CN | 101882231 A | 11/2010 |

(Continued)

OTHER PUBLICATIONS

EPO Search Report and Written Opinion for co-pending EP Appl. No. 20169320 dated Jun. 16, 2020 (9 pages).

(Continued)

*Primary Examiner* — Phong H Dang (74) *Attorney, Agent, or Firm* — Crowe & Dunlevy (57) ABSTRACT

A first communication interface is a contactless communication interface for an integrated circuit. A second communication interface is coupled to a processing unit external to the integrated circuit. The transfer of data between the first communication interface and the second communication interface is made in a transfer mode using a volatile memory circuit. The volatile memory circuit is accessible simultaneously or virtually simultaneously firstly to processing circuit coupled to said first communication interface and secondly to said processing unit via said second communication interface.

33 Claims, 6 Drawing Sheets

(56) References Cited

U.S. PATENT DOCUMENTS

2016/0360348 A1* 12/2016 Ueda ................. H04W 4/80
2019/0342225 A1* 11/2019 Sanghi ............... H04L 47/6205

FOREIGN PATENT DOCUMENTS

| CN | 103414497 A | 11/2013 |
| CN | 104850872 A | 8/2015 |
| CN | 107003905 A | 8/2017 |

OTHER PUBLICATIONS

INPI Search Report and Written Opinion for FR 1904338 dated Nov. 25, 2019 (12 pages).
First Office Action and Search Report for co-pending CN Appl. No. 202010326187.X dated Jun. 28, 2021 (9 pages).

* cited by examiner

EXCHANGE OF DATA WITHIN A DYNAMIC TRANSPONDER, AND CORRESPONDING TRANSPONDER

PRIORITY CLAIM

This application claims the priority benefit of French Application for Patent No. 1904338, filed on Apr. 25, 2019, the content of which is hereby incorporated by reference in its entirety to the maximum extent allowable by law.

TECHNICAL FIELD

Modes of implementation and embodiments relate to the transfer of data within an integrated circuit, between a contactless interface and an interface, for example an I²C interface, connected to a processing unit, for example a microcontroller, external to the integrated circuit.

BACKGROUND

Contactless transponders, in particular NFC ("near-field communication") transponders, for example tags, are intended to serve as a gateway between an external contactless communication apparatus, for example a cellular mobile telephone, also known under the term "smartphone", and a microcontroller of a connected system, for example a connected object such as a connected watch, or else a connected home automation device, or else a connected public device, for example a connected street light, without these examples being limiting.

Such transponders serving as a gateway may also be called "dynamic transponders", since the data temporarily stored in their memory may vary over time either on account of the external contactless communication apparatus or on account of the microcontroller.

Near-field communication, better known to those skilled in the art under the name NFC, is a wireless connectivity technology that allows communication over a short distance, for example 10 cm, between electronic devices, such as, for example, contactless chip cards or tags, and readers.

NFC technology is particularly suitable for connecting any type of user device and allows fast and easy communication.

A contactless transponder is a transponder that is capable of exchanging information via an antenna with a contactless reader, in accordance with a contactless communication protocol.

An NFC transponder, which is a contactless transponder, is a transponder that is compatible with NFC technology.

NFC technology is an open technological platform that has been standardized in the ISO/IEC 18092 and ISO/IEC 21481 standards, but incorporates numerous standards that already exist, such as, for example, the Type A and Type B protocols defined in the ISO-14443 standard, which may be communication protocols able to be used in NFC technology.

Contactless technology may also be used in RFID (Radiofrequency Identification) transponders that are compatible with the ISO 15693 and ISO 18000-3 standards.

During a transmission of information between a reader and a transponder, the reader generates a magnetic field by way of its antenna, which is generally a sinusoidal wave (the carrier) at 13.56 MHz in the standards that are conventionally used.

To transmit information from the reader to the transponder, the reader uses an amplitude modulation of said carrier.

The transponder, for its part, includes a processing circuit configured to demodulate the received carrier in order to obtain the data transmitted from the reader.

For a transmission of information from the transponder to the reader, the reader generates the magnetic field (the carrier) without modulation. The antenna of the transponder then modulates the field generated by the reader, on the basis of the information to be transmitted. The frequency of this modulation corresponds to a subcarrier of said carrier. The frequency of this subcarrier depends on the communication protocol that is used, and may be for example equal to 848 kHz.

This modulation is performed by modifying the load connected to the terminals of the antenna of the transponder.

Two modes of operation are then possible, a passive mode or an active mode.

In the passive mode, the transponder retromodulates the wave coming from the reader in order to transmit information and, to transmit the information, does not integrate a transmission circuit as such, or a transmitter, that is capable, for example, of generating its own magnetic field during the transmission. Such a transponder without a transmitter is called a passive transponder, in contrast to an active transponder that includes a transmitter.

Generally, a passive transponder does not have a power supply, because it uses the electromagnetic wave coming from the reader to power its integrated circuit.

In some applications, the passive transponder may incorporate a power supply, for example a cell.

In the active mode of operation, the reader and the transponder, called active transponder, both generate an electromagnetic field. In general, this mode of operation is used when the active transponder is provided with a dedicated power source, for example a battery.

Each of the NFC devices (reader and transponder) transmits the data using a modulation scheme.

In this case too, the modulation is reflected by a load modification, and reference is then made to communication through active load modulation.

In comparison with a passive communication mode, greater operating distances are obtained, which may range as far as 20 cm depending on the protocol that is used. By increasing the size of the antenna of the reader and/or the sensitivity of the reader, it is then possible to increase the distance up to distances possibly ranging up to several tens of cm, for example 60 cm.

Moreover, the use of active load modulation makes it possible to use very small antennas.

During the exchange between the transponder and the contactless reader, for example the "smartphone", the payload information or data are encapsulated in frames having a format that is defined depending on the type of protocol that is used. The processing circuit of the transponder are, in particular, configured to decapsulate the data that will be transferred to the external processing unit and, in the opposite direction, to encapsulate the data transmitted from the external processing unit, in frames that will be transmitted to the reader ("smartphone" for example) through contactless communication.

In some applications, the amount of data exchanged between the reader, the dynamic transponder and the external processing unit may be of the order of several kilobytes or even much more.

However, the transfer rate is limited at present.

Plus, it is the physical memory of the dynamic transponder that limits the efficiency of the transfer between the reader and the transponder. Specifically, this physical memory serves, as indicated above, to temporarily store the data exchanged between the processing circuit of the transponder and the processing unit, for example a microcontroller, external to the integrated circuit.

Specifically, a conventional transponder may be equipped with a non-volatile memory that has a large memory capacity but a slow write speed, or else a volatile memory with fast access but small memory capacity.

In the first case (non-volatile memory that has a large capacity), a large amount of data is able to be written within the limit of the memory capacity of the non-volatile memory before these data are read to the microcontroller, but the overall transfer of the data between the processing circuit of the transponder and the microcontroller, and therefore between the external contactless reader and the microcontroller, is slow.

In the second case (volatile memory having a small capacity), the data are written to the volatile memory in successive frames that are then read in succession by the microcontroller. Each frame has to be read before the next one is able to be written, therefore limiting the size of the frame to the size of the physical memory.

Moreover, each elementary transfer of a frame is fast but, as the memory is accessible sequentially either to the processing circuit of the transponder (and therefore to the external contactless reader) or to the microcontroller, there is a latency time between the transfer of each frame, this having a negative impact on the overall transfer rate or overall bit rate ("overall data rate").

There is therefore a need to configure a dynamic transponder such that a very large amount of data is able to be exchanged quickly and without impacting the overall transfer rate.

SUMMARY

Embodiments herein apply equally to passive transponders and to active transponders.

According to one aspect, what is proposed is a method for transferring data between a first communication interface and a second communication interface of an integrated circuit.

The first communication interface is a contactless communication interface.

The second interface may be a serial or parallel interface. It may be, for example, an I²C ("inter-integrated circuit") or SPI ("serial peripheral interface") interface.

This second interface is coupled to a processing unit, for example a microcontroller, external to the integrated circuit.

The method comprises a first transfer mode including temporary storage of the transferred data in a first volatile memory circuit accessible simultaneously or virtually simultaneously firstly to the processing circuit, for example a wired logic unit and/or a microprocessor, coupled to said first communication interface, and secondly to the processing unit, for example the microcontroller, via said second communication interface.

The use of a volatile memory simultaneously accessible to the processing circuit coupled to the contactless interface and accessible to the microcontroller via the second interface makes it possible to emulate a "virtual" volatile memory having a large memory capacity from a physical volatile memory having a small memory capacity, while at the same time offering a fast data exchange rate without impacting the overall transfer rate.

This makes it possible, for example, to transfer larger frames, or even frames significantly larger than the physical size of the internal memory of the transponder, eliminating the constraint of limiting the maximum size of a frame to be transferred to the physical size of the internal memory of the transponder and increasing the overall transfer rate or overall bit rate ("overall data rate").

Specifically, the processing circuit may, for example, write to a first portion of the memory while the microcontroller may simultaneously or virtually simultaneously read a second portion of the memory previously written to by the processing circuit, the roles of the first and second portions being alternately and successively swapped, thereby constantly freeing up a portion of the memory for a write operation, and therefore offering a virtually infinite memory capacity.

The same principle may apply in the opposite direction for a write operation by the microcontroller and a read operation by the processing circuit.

The expression "virtually simultaneously" is understood as meaning, for example, "simultaneously to within a starting latency".

This starting latency corresponds to the time necessary to write enough data originating either from the processing circuit or from the external processing unit (microcontroller) to memory so that reading thereof from memory is able to boot respectively either the processing unit via the second interface or the processing circuit.

It is advantageous for the first memory circuit to be accessible to the processing circuit at a first access rate and to said processing unit at a second access rate, the second access rate being greater than or equal to, and preferably greater than, the first access rate.

This is very particularly beneficial for contactless dynamic transponders intended to exchange data with a contactless reader at a rate, for example of 400 kbits/s, lower than the rate at which the microcontroller accesses the volatile memory via the second interface, for example 1 Mbits/s for a second I²C interface or 10 Mbits/s for a second SPI interface ("serial peripheral interface").

Specifically, the reader is thus able to send frames having a length greater than the memory capacity of the first memory circuit (physical memory of the transponder), and without this memory imposing, due to its capacity, a pause in the transmission of the frames (of course, pauses may be imposed by the contactless protocol itself, but these are not imposed on account of the internal memory of the transponder), and the transponder is able to asynchronously read these frames without limiting the send rate of the frames by the reader.

The starting latency for the reading of the first frame may be adjusted, for example, by the size of the first memory circuit or by defining a sufficient amount of written data to trigger the read operation.

Numerous possibilities exist for implementing the first memory circuit.

According to a first possible variant, the first memory circuit may include a "double buffer" architecture.

More precisely, said first memory circuit may comprise at least a first volatile memory and a second volatile memory that are accessible either in read mode or in write mode.

Although there will be a limitation to two memories in practice, the possibility of using more than two memories accessible either in read mode or in write mode is not ruled out.

In this first variant, the data received on the first interface are contained in at least one frame having a length greater than the memory capacity of each of the volatile memories, and for each received frame, the processing circuit extract the data therefrom and segment them into successive packets.

These packets contain a plurality of data words, for example several bytes of data.

The size of the packets advantageously corresponds to the memory capacity of each volatile memory.

According to one mode of implementation suited to this variant, the temporary storage comprises, for a transfer of data from the first communication interface to the second communication interface, interrupt-free writing, by the processing circuit, of the successive data packets of a frame alternately to the first memory and to the second memory, and reading, by the processing unit, of the successive packets of the frame alternately from the second memory and from the first memory, said read operation being simultaneous for at least some of said packets.

Specifically, while the switch from one memory to the other must not interrupt the writing of the packets (in other words, the writing, by the processing circuit, of the successive data packets of a frame alternately to the first memory and to the second memory is advantageously performed without interruption), the reading of the memories may possibly be interrupted in a manner controlled by the external processing unit. In this case, the reading of certain packets may not be completely simultaneous with the writing of certain packets, as long as all of the packets are advantageously written continuously.

Advantageously, to initiate this process, it is possible to wait for the first memory to be completely written to before starting to read said memory.

Again for a transfer of data from the first communication interface to the second communication interface, said temporary storage comprises, according to one mode of implementation, a) writing, by the processing circuit, of a packet of the frame to the first memory and simultaneous reading, by the processing unit, of the packet previously written to the second memory, b) then, when said first memory is written to, writing, by the processing circuit, of the next packet of the frame to said second memory and simultaneous reading, by the processing unit, of the packet previously written to said first memory, and c) then, when the second memory is written to, possibly at least one repetition of steps a) and b) for any following packets until said data have been completely transferred from said frame.

With regard to a transfer of data from the second communication interface to the first communication interface for the purpose of encapsulating these data in a frame, the temporary storage comprises, according to one mode of implementation, interrupt-free reading, by the processing circuit, of the data in successive packets alternately from the second memory and from the first memory, and when one of the memories has been read by the processing circuit, writing, by the processing unit, of a packet to this memory at the same time as the reading of the content of the other memory by the processing circuit.

Again for a transfer of data from the second communication interface to the first communication interface, the temporary storage comprises, according to one mode of implementation, d) reading, by the processing circuit, of a packet of said data from the first memory previously written by the processing unit and simultaneous writing, by the processing unit, of the next packet to the second memory previously read by the processing circuit, e) then, when said packet has been read by the processing circuit from the first memory, reading, by the processing circuit, of said next packet from the second memory and simultaneous writing, by the processing unit, of the packet following said next packet to the first memory, and f) then, when the second memory has been read, possibly at least one repetition of steps d) and e) for any following packets until said data to be transmitted have been completely transferred into said frame.

In another possible variant, said first memory circuit may comprise a circular memory having a write pointer and a read pointer.

In this other variant, the data received on the first interface are also contained in at least one frame having a length greater than the memory capacity of the circular memory, and for each received frame, the processing circuit this time do not segment the data of the frame into packets but extract the data on the fly, word by word.

In theory, each word could comprise just a single bit, but in practice it comprises several bits, for example eight bits to form a byte.

According to one mode of implementation suited to this other variant, the temporary storage comprises, for a transfer of data from the first communication interface to the second communication interface, writing, by the processing circuit, of the data in successive words to the circular memory at the speed of the write pointer, and simultaneous reading, by the processing unit, at the speed of the read pointer, of the successive words previously written to the circular memory, the read pointer travelling behind the write pointer.

With regard to a transfer of data from the second communication interface to the first communication interface, the temporary storage comprises, according to one mode of implementation, reading, by the processing circuit, of successive words of said data from the circular memory at the speed of the read pointer, each read word having been written beforehand by the external processing unit at the speed of the write pointer as a replacement for a word previously read by the processing circuit.

In order, for example, to be compatible with conventional transponder architectures, the method may comprise a second transfer mode including temporary storage of the data in a second memory circuit accessible sequentially to the processing circuit and to said processing unit via said second communication interface.

In this respect, and without limitation, there are numerous possibilities.

The second memory circuit may be separate from the first memory circuit, for example a non-volatile memory.

The second memory circuit may also be the first memory circuit configured to form a single memory accessible sequentially, and not simultaneously, to the processing circuit and to the microcontroller.

It is possible to make a selection of the first or of the second transfer mode on command.

Such a selection may comprise for example a choice between the first memory circuit and the second memory circuit when these two memory circuit are present in the integrated circuit, or else a reconfiguration of the first memory circuit as the second memory circuit.

Of course, it is possible to alternate between the two transfer modes.

According to one mode of implementation, the first communication interface is an interface compatible with near-field communication (NFC).

As indicated above, the second communication interface may be an SPI or I²C interface.

The first access rate may be greater than or equal to 100 Kbits/s and less than 848 Kbits/s, for example equal to 400

Kbits/s, and the second access rate, greater than or equal to the first access rate, may be greater than or equal to for example 1 Mbits/s.

As a variant, the first rate may be equal to 106 Kbits/s and the second rate may be equal to 400 Kbits/s.

According to another aspect, an integrated circuit comprises a first contactless communication interface, a second communication interface configured to be coupled to a processing unit external to the integrated circuit, processing circuit coupled to the first interface, and a first volatile memory circuit configured, in a first transfer mode, to temporarily store data transferred between the two communication interfaces, the first volatile memory circuit being configured to be accessible simultaneously or virtually simultaneously firstly to the processing circuit and secondly to said processing unit via said second communication interface.

According to one embodiment, the first memory circuit is accessible to the processing circuit at a first access rate and to said processing unit at a second access rate, the second access rate being greater than or equal to the first access rate.

According to one variant, said first memory circuit comprises at least a first volatile memory and a second volatile memory that are accessible either in read mode or in write mode.

In this variant, the data intended to be received on the first interface are contained in at least one frame having a length greater than the memory capacity of each of the volatile memories, and for each received frame, the processing circuit is configured to extract the data therefrom and segment them into successive packets.

According to one embodiment suited to this variant, for a transfer of data from the first communication interface to the second communication interface, the processing circuit is configured to perform interrupt-free writing of the successive data packets of a frame alternately to the first memory and to the second memory, and the second communication interface is configured to deliver, to the first memory circuit, read command signals emanating from the processing unit and deliver, to the processing unit, successive packets of the frame alternately read from the second memory and from the first memory, said delivery being simultaneous for at least some of said packets.

Specifically, as explained above, the processing circuit is advantageously configured to perform said interrupt-free write operation, while the processing unit may possibly interrupt said read operation in a controlled manner, as long as said write operation continues without interruption.

According to one embodiment, the processing circuit is configured to read a packet of the frame from the first memory and the second communication interface is configured to simultaneously deliver a read command to the second memory emanating from the processing unit and deliver, to the processing unit, the packet of the frame previously written to the second memory, b) then, when said first memory is written to, the processing circuit is configured to write the next packet of the frame to said second memory and the second communication interface is configured to simultaneously deliver a read command to the first memory emanating from the processing unit and deliver, to the processing unit, the packet of the frame previously written to said first memory, and c) then, when the second memory is written to, the processing circuit and the second communication interface are configured to perform at least one repetition of the operations mentioned at points a) and b) for any following packets until said data have been completely transferred from said frame.

According to one embodiment, for a transfer of data from the second communication interface to the first communication interface for the purpose of encapsulating these data in a frame, the processing circuit is configured to perform interrupt-free reading of the data of the frame in successive packets alternately from the second memory and from the first memory, and when one of the memories has been read by the processing circuit, the second communication interface is configured to deliver a write command to this memory emanating from the processing unit and deliver, to this memory, a packet to be written emanating from the processing unit, the processing circuit further configured to simultaneously read the content of the other memory.

Again for a transfer of data from the second communication interface to the first communication interface and according to one embodiment, d) the processing circuit is configured to read a packet of said data from the first memory previously written by the processing unit via the second communication interface, and the second communication interface is configured to simultaneously deliver a write command to the second memory previously read by the processing circuit and deliver, to this second memory, the next packet to be written emanating from the processing unit, e) then, when said packet has been read by the processing circuit from the first memory (as indicated above, the processing circuit is configured to perform this reading in step d) without interruption), the processing circuit is configured to read said next packet from the second memory and the second communication interface is configured to simultaneously deliver a write command to the first memory and deliver, to this first memory, the packet following said next packet and emanating from the processing unit, and f) then, when the second memory has been read, the processing circuit and the second communication interface are configured to perform at least one repetition of the operations mentioned at points d) and e) for any following packets until said data to be transmitted have been completely transferred into said frame.

According to another variant, said first memory circuit comprises a circular volatile memory having a write pointer and a read pointer.

In this other variant, the data received on the first interface are also contained in at least one frame having a length greater than the memory capacity of the circular memory, and for each received frame, the processing circuit is configured to extract the data on the fly, word by word, for example byte by byte.

According to one embodiment suited to this other variant, for a transfer of data from the first communication interface to the second communication interface, the processing circuit is configured to write the data in successive words to the circular memory at the speed of the write pointer, and the second communication interface is configured to simultaneously deliver read commands to the circular memory and deliver, to the processing unit, at the speed of the read pointer, successive words previously written to the circular memory, the read pointer being configured to travel behind the write pointer.

According to one embodiment, for a transfer of data from the second communication interface to the first communication interface, the processing circuit is configured to read successive words of said data from the circular memory at the speed of the read pointer, each read word having been written beforehand by the processing unit via said second communication interface at the speed of the write pointer as a replacement for a word previously read by the processing circuit.

The integrated circuit may comprise a second memory circuit (which may or may not reuse the first memory circuit in a configuration with sequential access) configured, in a second transfer mode, to temporarily store data transferred between the two communication interfaces, the second memory circuit being configured to be accessible sequentially to the processing circuit and to said processing unit via said second communication interface.

According to one embodiment, the integrated circuit comprises selection means configured to select the first or the second transfer mode on command.

According to one embodiment, the first communication interface is an interface compatible with near-field communication.

According to one embodiment, the second communication interface is an SPI or I²C interface.

According to another aspect, a transponder comprises an integrated circuit as defined above, an antenna coupled to the first communication interface, the transponder being configured to communicate with an external contactless communication apparatus in accordance with a contactless communication protocol.

According to another aspect, a system comprises a transponder as defined above and the processing unit coupled to the second communication interface.

This system may be a connected system, for example a connected object such as a connected watch, or else a connected home automation device, or else a connected public device, for example a connected street light, without these examples being limiting.

BRIEF DESCRIPTION OF THE DRAWINGS

Other features and advantages of the invention will become apparent on examining the detailed description of wholly non-limiting modes of implementation and embodiments and the appended drawings, in which.

DETAILED DESCRIPTION

Figure 1:
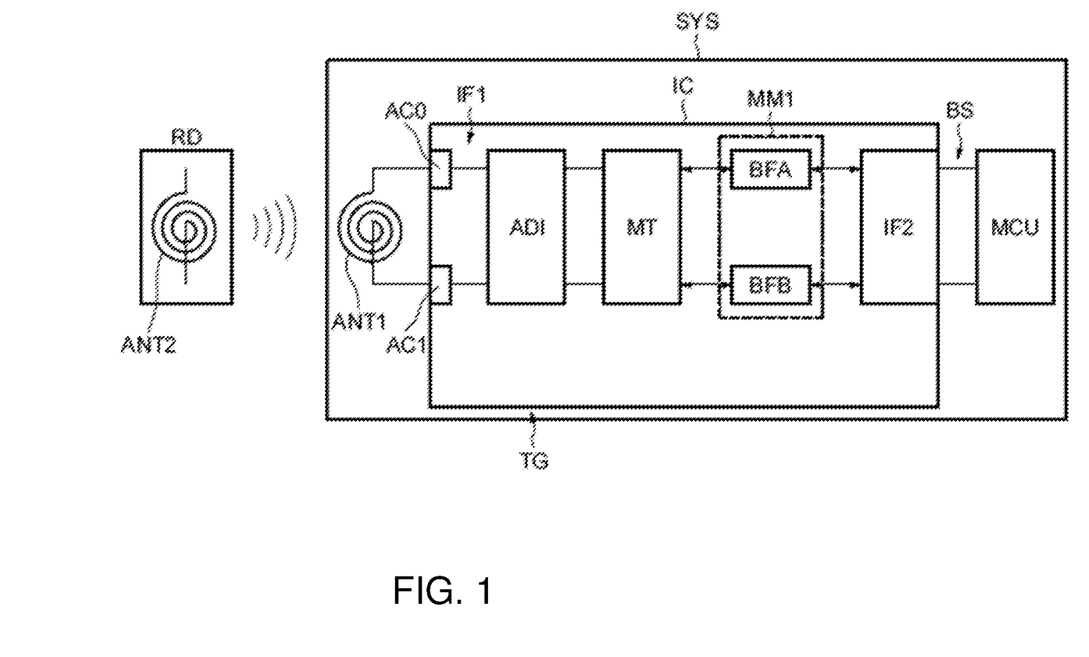
FIG. 1 schematically illustrates a system including a contactless transponder and reader.

In FIG. 1, the reference TG denotes a contactless transponder. In this example, the transponder is a contactless passive transponder configured to communicate with a reader RD, for example a cellular mobile telephone of "smartphone" type, equipped with a contactless antenna ANT2, via its antenna ANT1 using a carrier signal having a frequency for example of 13.56 MHz.

The transponder TG is in this case a transponder that is capable of communicating in accordance with a contactless communication protocol that uses near-field communication (NFC) technology, for example.

This transponder may also be an RFID transponder using this NFC technology.

This transponder TG comprises an integrated circuit IC, for example an integrated circuit of the ST25 family marketed by STMicroelectronics.

The integrated circuit IC includes two terminals AC0 and AC1 that are respectively connected to the two terminals of the antenna ANT1.

The two terminals AC0 and AC1 in this case form a first contactless communication interface IF1 of the integrated circuit IC.

The integrated circuit IC also includes processing circuit MT, including for example an energy recovery circuit, a microprocessor and/or a wired logic unit.

The processing circuit is in particular configured to deliver a supply voltage to the entire integrated circuit from the magnetic field received from the reader, process the information received from the reader and retromodulate the carrier signal for the purpose of transmitting information to the reader.

The integrated circuit IC also includes, as is conventional, an impedance-matching network ADI forming, with the antenna ANT1, a resonant circuit at the carrier frequency, in this case 13.56 MHz.

The integrated circuit IC also includes a second communication interface IF2, in this case an I²C interface linked, by an I²C bus, referenced BS, to a processing unit external to the integrated circuit, referenced MCU, for example a microcontroller. As is conventional, the microcontroller MCU is the master device on the bus BS, and the communication interface IF2 is a slave device.

Between the processing circuit MT and the second communication interface IF2 there is coupled a first volatile memory circuit MM1, the functionality and structure of which will be described in more detail herein.

The transponder-microcontroller MCU assembly forms part of a system SYS, for example a connected apparatus.

The transponder TG is in this case a dynamic transponder acting as a gateway for the transmission of information from the reader RD to the microcontroller MCU and in the opposite direction for the transmission of information from the microcontroller MCU to the reader RD.

In NFC technology, information or data are generally transmitted in the form of frames, as is the case, for example, for the Type A protocol of the ISO-14443 standard.

The exchanged frames contain headers, data bits, and parity or cyclic redundancy control bits (CRC bits).

Conventionally, at transmission the parity or CRC bits are calculated by the processing circuit from the data bits that have to be actually transmitted on the transmission channel between the two antennas ANT1 and ANT2, and from a predetermined calculation rule that is generally specific to the communication standard that is used.

At reception, the received parity or CRC bits are verified by the processing circuit MT by calculating these parity or CRC bits from said received data bits and from said calculation rule, and then comparing these calculated parity or CRC bits with the parity bits extracted from the received frames.

The processing circuit MT is therefore configured, at reception, to extract the data from the received frames in order to write them to the first memory circuit MM1.

The microcontroller MCU is then configured to read these data from the first memory circuit MM1 via the second communication interface IF2.

At transmission, that is to say from the microcontroller MCU to the reader RD, the microcontroller MCU writes the data to be transmitted from the first memory circuit MM1 via the second communication interface IF2.

The processing circuit is configured to read these data from the memory circuit MM1 and transmit them to the reader RD through retromodulation, in particular by calculating the parity or CRC bits and by encapsulating all of these data in frames.

The first volatile memory circuit MM1 is generally accessible simultaneously or virtually simultaneously firstly to the processing circuit MT and secondly to the processing unit MCU via the second communication interface IF2.

In the example illustrated in FIG. 1, the first memory circuit MM1 includes a double buffer architecture.

More precisely, the first memory circuit MM1 comprises a first volatile memory BFA and a second volatile memory BFB, both accessible either in read mode or in write mode.

When the data are exchanged between the processing circuit and the external processing unit MCU, these data will be stored temporarily in the first memory circuit MM1.

In NFC technology, the size of the frames may be, for example, 4 kilobytes, 32 kilobytes or 256 kilobytes.

The radiofrequency transmission bit rate or rate between the reader and the transponder or between the transponder and the reader is, for example, 400 kilobits per second.

Moreover, the bit rate supported by the second communication interface IF2 may be, for example, of the order of 1 megabit per second.

Moreover, the memory capacity of each of the memories BFA and BFB is, for example, 128 bytes.

As a result, whether in one direction or in the other, the exchanged data will be temporarily stored in the first memory circuit MM1 in packets, for example packets of 128 bytes in this case.

Figure 2:
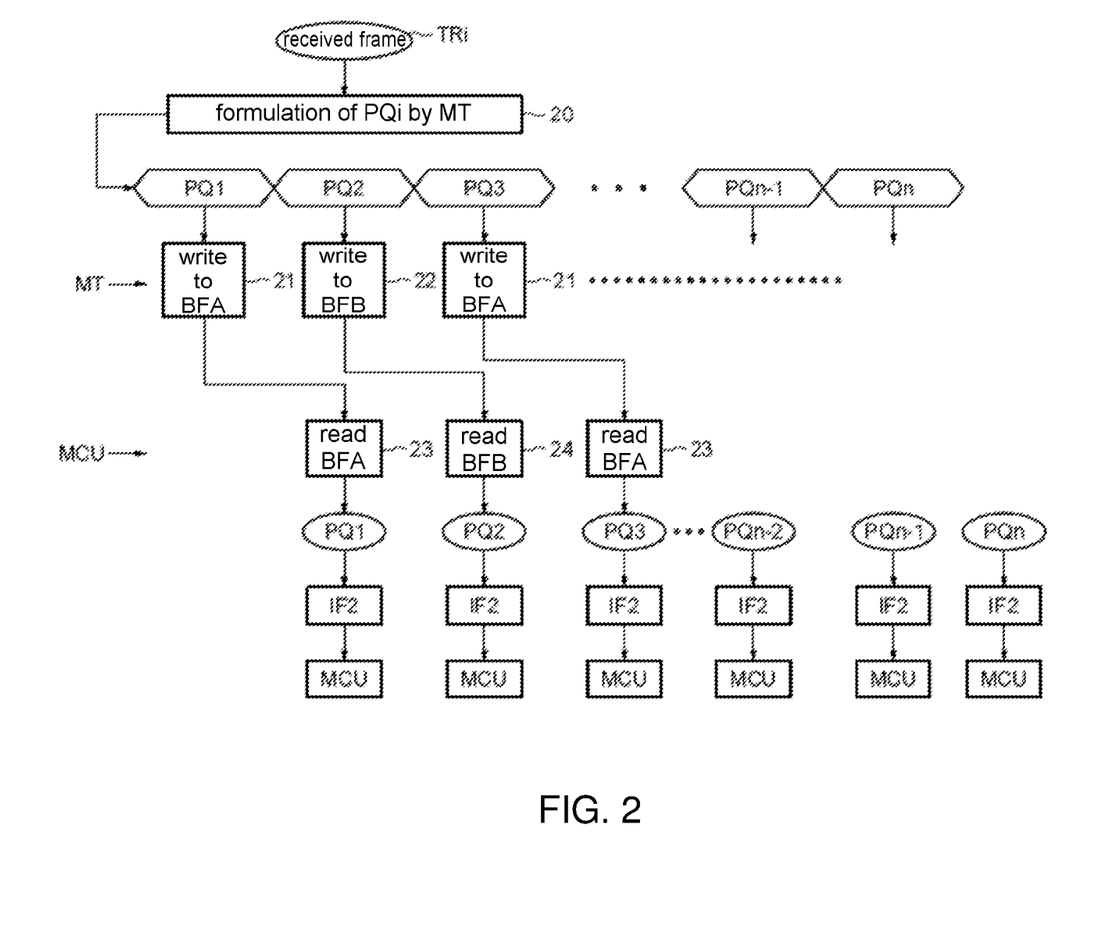
FIG. 2 illustrates one example of a transfer of data from a first interface to a second interface.

Reference is now made more particularly to FIG. 2 in order to illustrate one example of a transfer of data from the first interface IF1 to the second interface IF2.

It is assumed in this example that the microcontroller MCU does not interrupt its read operation on the data written to the first memory circuit MM1.

In this transfer direction, the data received on the first interface are contained in at least one frame having a length greater than the memory capacity of each of the volatile memories, and for each received frame, the processing circuit MT extracts the data therefrom and segments them into successive packets PQi, for example packets of 128 bytes in this case.

More precisely, the processing circuit MT, during the reception of the data from the received frames, will write the data in successive packets PQi alternately to the first memory BFA and to the second memory BFB, and the processing unit MCU will simultaneously read successive packets PQj alternately from the second memory and from the first memory.

This process of alternating between writing to and reading from the two memories begins once one of the memories, for example the memory BFA, has been completely written to by the processing circuit.

More precisely, in step 20, the processing circuit MT extracts the data from the received frame TRi and segments them sequentially into packets PQi. The first packet PQ1 is written, by the processing circuit MT, to the first memory BFA for example.

When this first memory is completely written to, a signal is transmitted to the processing unit MCU by way of a specific pin (not shown here) to tell it that the packet PQ1 may be read.

At the same time as the reading, in step 23 by the microcontroller MCU, of the packet PQ1 stored in the first memory BFA, the processing circuit MT writes (step 22) the second packet PQ2 to the second memory BFB.

The packet PQ1 is for its part delivered to the microcontroller MCU via the interface IF2.

Given the fact that the bit rate of the radiofrequency link (400 kilobits per second for example) is less than the bit rate of the I$^2$C link (1 megabit per second for example), the rate at which the memories BFA and BFB are accessed by the processing circuit MT is less than the rate at which these same memories are accessed by the microcontroller MCU.

Therefore, the reading 23 of the packet PQ1 from the memory BFA takes place more quickly than the writing of the packet PQ2 to the memory BFB.

Therefore, the memory BFA is ready to be written to with another packet while the processing circuit have not yet finished writing the packet PQ2 to the memory BFB.

Thus, when the processing circuit MT have finished writing the packet PQ2 to the memory BFB, they are immediately able to write the packet PQ3 to the memory BFA (step 21) while, simultaneously, the microcontroller MCU will read (step 24) the packet PQ2 that had been stored in the memory BFB.

This packet PQ2 will be transmitted to the microcontroller MCU via the second interface IF2.

The packet PQ3 will be read (step 23) from the memory BFA by the microcontroller MCU in the following step while, simultaneously, the processing circuit MT will write the packet PQ4 to the memory BFB.

These operations are thus repeated for the following packets until the last packet PQn.

Thus, the processing circuit writes to one of the two memories while the microcontroller simultaneously or virtually simultaneously reads the other memory, the roles of the first and second memories being alternately and successively swapped, thereby constantly freeing up a memory BFA or BFB for a write operation, and therefore offering a virtually infinite memory capacity.

Moreover, as the first memory circuit MM1 is accessible to the processing circuit MT at a first access rate and to the microcontroller MCU at a second access rate, the second access rate (1 megabit per second for example) being greater than or equal to the first access rate (400 kilobits per second), there is then no latency time between the packets of one and the same frame, or latency time between the successive data frames exchanged between the contactless reader and the transponder, because there is always one of the two memories BFA or BFB that is available in write mode to the processing circuit when a data packet arrives.

Figure 3:
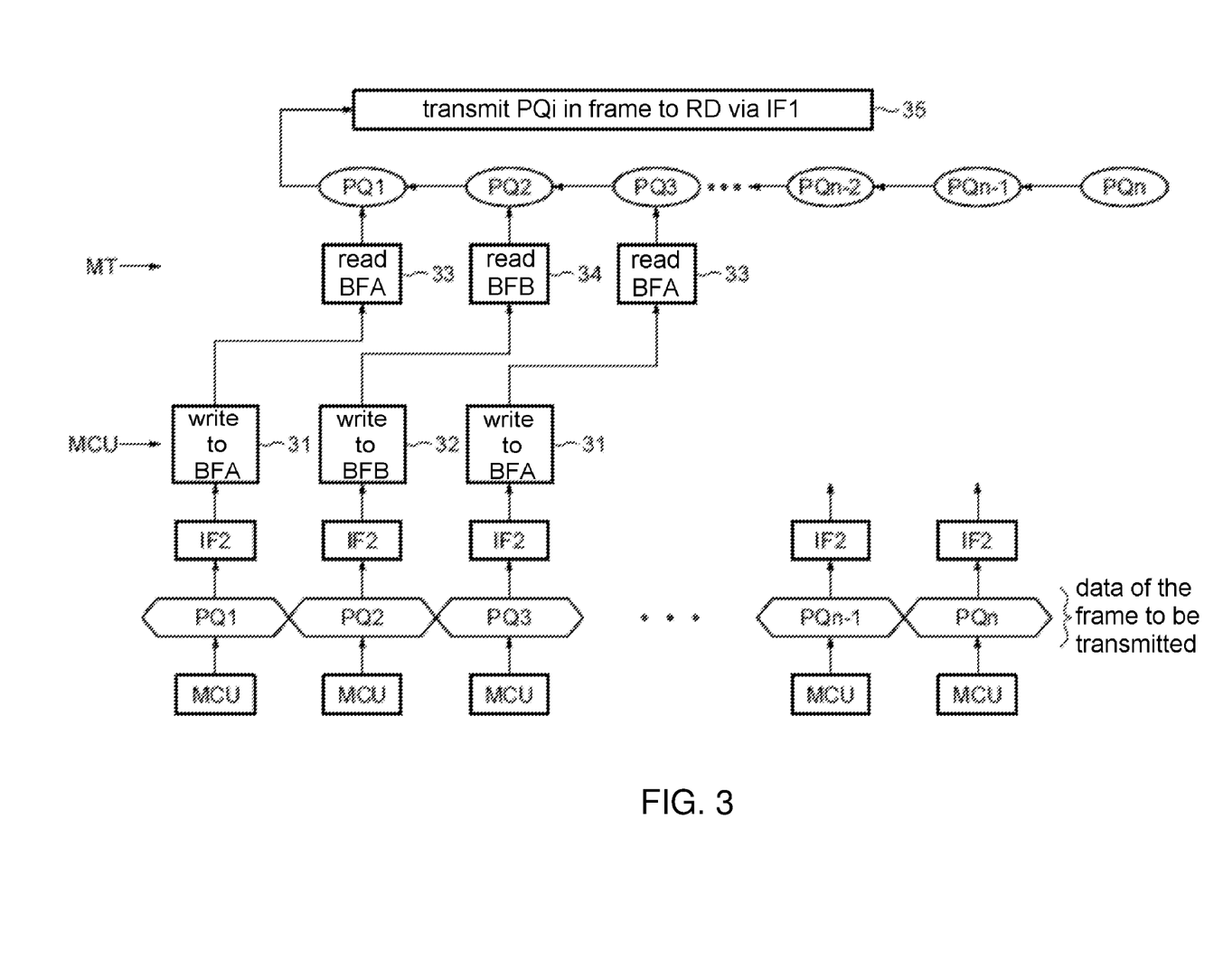
FIG. 3 illustrates one example of a transfer of data from the second communication interface to the first communication interface.

Reference is now made more particularly to FIG. 3 in order to illustrate one example of a transfer of data from the second communication interface IF2 to the first communication interface IF1 for a transmission 35 of the packets within a frame to the reader RD.

Generally speaking, the temporary storage in this case comprises reading, by the processing circuit MT, of the successive packets alternately from the second memory BFB and from the first memory BFA and, when one of the memories has been read by the processing circuit MT, there is writing, by the microcontroller MCU, of a packet to this memory at the same time as the reading of the content of the other memory by the processing circuit MT.

More precisely, the first packet PQ1 delivered by the microcontroller MCU is transmitted to the second interface IF2 in order to be written (step 31) to the first memory BFA, for example.

Without waiting for the other packets, as soon as the reader RD initiates the reading of the frame, the processing circuit MT, in step 35, then formulates the header of the frame and begins to transmit the packet PQ1 to the reader RD via the first communication interface IF1, after reading 33 this packet PQ1 from the first memory BFA.

As the second memory BFB is available, at the same time as the reading 33 of the first memory BFA, the microcontroller MCU delivers the second packet PQ2 to the second communication interface IF2 so that said second packet is written (step 32) to this second memory BFB.

When the processing circuit MT has finished reading the content of the first memory BFA in order to extract the packet PQ1 therefrom, a signal is sent to the microcontroller MCU to indicate that this first memory BFA is available for a write operation.

The microcontroller MCU therefore writes the packet PQ3 to the first memory BFA via the interface IF2, whereas the second packet PQ2 is read by the processing circuit MT from the second memory BFB (step 34).

The operations that have just been described are repeated for the following packets until the last packet PQn, completing the frame that is to be transmitted from the microcontroller MCU to the reader RD.

In this case too, there is no latency between the packets of the same frame and between the frames transmitted from the transponder to the reader RD, because the microcontroller MCU will have written a packet to one of the two memories well before the processing circuit MT are ready to read this packet.

Figure 4:
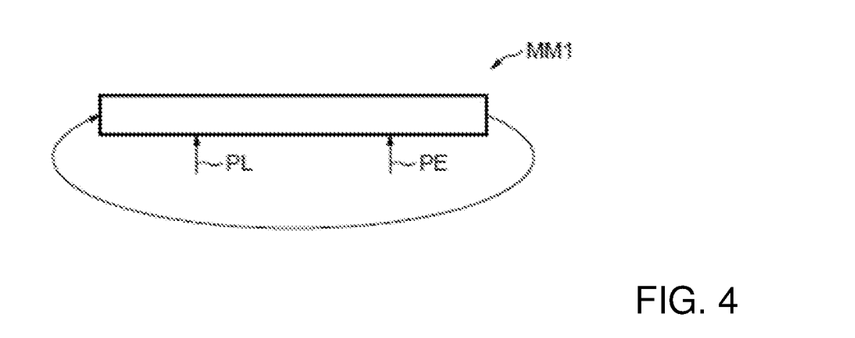
FIG. 4 schematically illustrates a circular memory.

In another variant embodiment illustrated schematically in FIG. 4, the first memory circuit MM1 may comprise a circular memory having a write pointer PE and a read pointer PL.

In this other variant, the data received on the first interface are also contained in at least one frame having a length greater than the memory capacity of the circular memory, and for each received frame, the processing circuit MT are configured to extract the data on the fly, word by word, for example byte by byte.

For example, the memory capacity of this circular memory may be equal to 256 bytes, although this example is not limiting.

Figure 5:
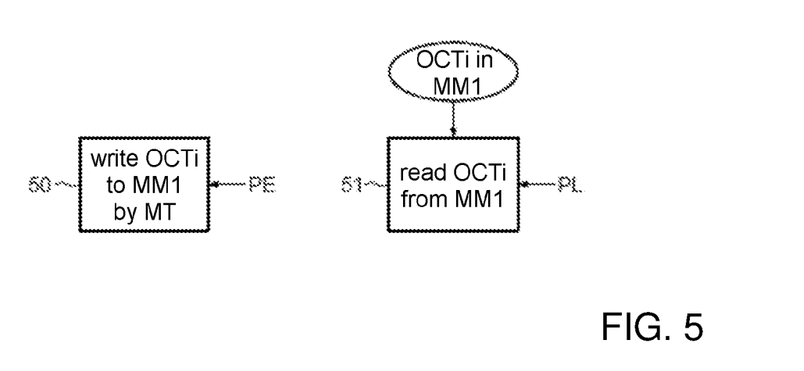
FIG. 5 illustrates an example for writing data to the circular memory.

As illustrated in FIG. 5, for a transfer of data from the first communication interface IF1 to the second communication interface IF2, there is provision for the processing circuit MT to write 50 the data in successive bytes OCTi to the circular memory at the speed of the write pointer PE.

Moreover, there is simultaneous reading 51, by the microcontroller MCU, at the speed of the read pointer PL, of the successive bytes OCTi previously written to the circular memory MM1.

Plus, the read pointer travels behind the write pointer.

In other words, the write pointer is always in front of the read pointer as it travels through the addresses of the circular memory MM1.

An indicator of the amount of data available for reading, such as a counter, and a comparator having a reference value that may be either programmable or set, serves to signal to the microcontroller MCU that a certain amount of data are available for reading. The microcontroller MCU may thus read the memory MM1 on its own initiative.

Likewise, an indicator that the write pointer has caught up with the read pointer through comparison with this same reference value (or another reference value) will tell the microcontroller MCU that a read operation should imperatively be performed in order to avoid a loss of data ("overflow").

These means configured to deliver, to the second communication interface IF2, a first item of information and a second item of information that are intended for the processing unit MCU, the first item of information indicating the amount of data available for reading in the circular memory MM1, the second item of information signaling a risk of loss of data if the circular memory MM1 is not read by the processing unit MCU may, for example, be incorporated at least partly into the processing circuit MT.

Figure 6:
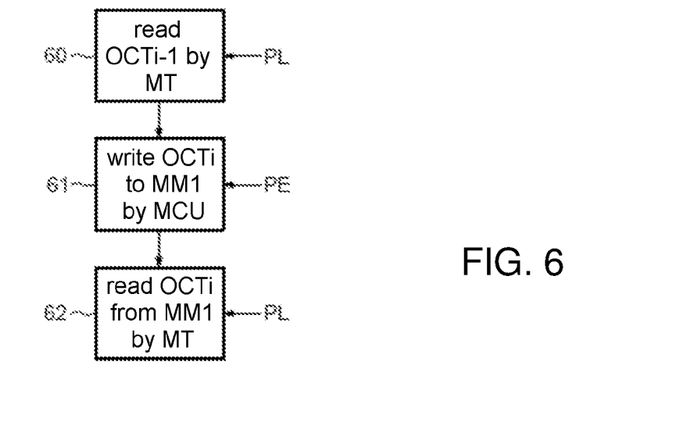
FIG. 6 illustrates an example for temporary storage of the data.

For a transfer of data from the second communication interface IF2 to the first communication interface IF1, the temporary storage of the data comprises, as illustrated schematically in FIG. 6, reading 62, by the processing circuit MT, of successive bytes of data OCTi from the circular memory MM1 at the speed of the read pointer PL.

Each read byte OCTi has been written beforehand (step 61) by the external processing unit MCU at the speed of the write pointer PE as a replacement for a byte OCTi-1 previously read (step 60) by the processing circuit MT at the speed of the read pointer.

Although a first possible transfer mode for the data has just been described, using the first memory circuit MM1 accessible simultaneously or virtually simultaneously to the processing circuit MT and to the microcontroller MCU, it is possible, for example, to be compatible with conventional transponder architectures, to provide a second transfer mode including temporary storage of the data in a second memory circuit accessible sequentially to the processing circuit MT and to the processing unit MCU via the second communication interface.

Figure 7:
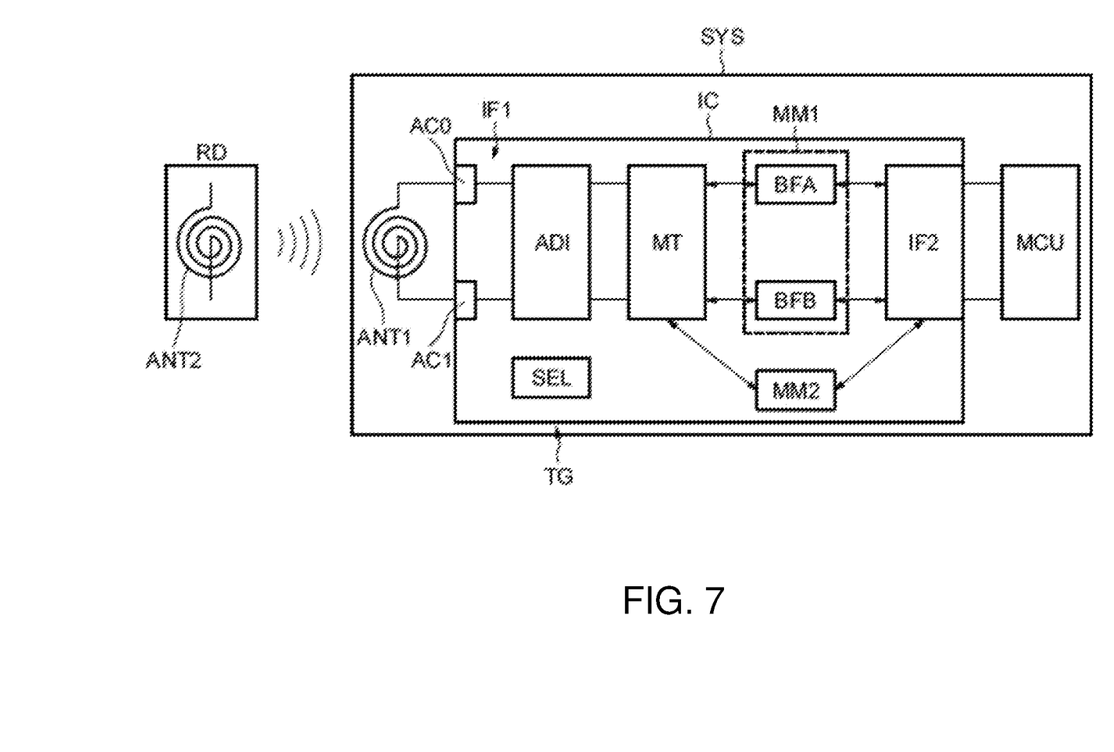
FIG. 7 illustrates another transfer mode.

This embodiment is illustrated schematically in FIG. 7.

In this example, the second memory circuit MM2 may be a non-volatile memory.

As a variant, as indicated above, it is also possible to configure the two memories BFA and BFB such that they form just a single memory MM2 accessible sequentially to the processing circuit MT and the microcontroller MCU, and not simultaneously.

In other words, a module (the processing circuit or the microcontroller) uses the memory MM2, in write mode or in read mode, and the other module waits for the first module to have finished before being able to use the memory MM2 in read mode or in write mode.

In fact, this second transfer mode is a transfer mode that is conventionally implemented in modern transponders.

Figure 8:
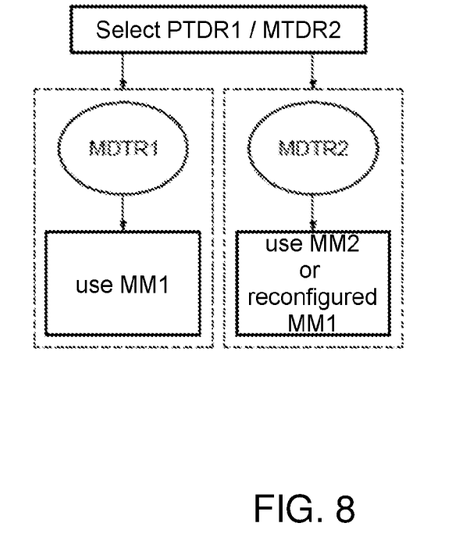
FIG. 8 illustrates operation for making a selection of the transfer mode.

It is also possible, as illustrated in FIG. 8, to make a selection of the first transfer mode MDTR1 or of the second transfer mode MDTR2 on command.

If the first transfer mode MDTR1 is selected, then the first memory circuit MM1 is used, in its double buffer architecture or in its circular memory architecture for example.

If the second transfer mode MDTR2 is selected, then the memory MM2 with the sequential access operations, or else the memory circuit MM1 reconfigured as a single sequential-access memory, is used.

Selection means SEL, implemented for example by logic circuitry, select the first transfer mode MDTR1 or the second transfer mode MDTR2.

The invention claimed is:

1. A method for transferring data within a system comprising an integrated circuit, a processing circuit, and an antenna, the integrated circuit comprising a first communication interface and a second communication interface, the first communication interface being a contactless communication interface coupled to said antenna and the second communication interface being coupled to a processing unit external to the integrated circuit, the method comprising:
- in a first transfer mode, transferring data from the first communications interface to the second communication interface, and transferring data from the second communication interface to the first communication interface,
- wherein the first transfer mode includes temporarily storing the transferred data in a first memory circuit accessible simultaneously firstly to the processing circuit and secondly to said processing unit via said second communication interface; and
- delivering to the second communication interface a first item of information and a second item of information that are intended for the processing unit, the first item of information indicating an amount of data available for reading in a circular volatile memory of the first memory circuit, and the second item of information signaling a risk of loss of data if the circular volatile memory is not read by the processing unit.

2. The method according to claim 1, wherein the first memory circuit is accessible to the processing circuit at a first access rate and is accessible to said processing unit at a second access rate, the second access rate being greater than or equal to the first access rate.

3. The method according to claim 1, wherein said first memory circuit comprises at least a first volatile memory and a second volatile memory that are accessible either in read mode or in write mode.

4. The method according to claim 3, wherein the data received on the first communication interface are contained in at least one frame having a length greater than a memory capacity of each of the first and second volatile memories, the method further comprising, for each received frame, extracting by the processing circuit of the data from the received frame and segmenting the extracted data into successive packets.

5. The method according to claim 4, wherein temporarily storing comprises, for a transfer of data from the first communication interface to the second communication interface:
- interrupt-free writing, by the processing circuit, of successive data packets of a frame alternately to the first volatile memory and to the second volatile memory, and
- reading, by the processing unit, of the successive packets of the frame alternately from the second volatile memory and from the first volatile memory, said reading being simultaneous for at least some of the packets.

6. The method according to claim 5, wherein temporarily storing further comprises:
- a) writing, by the processing circuit, of a packet of the frame to the first volatile memory and simultaneous reading, by the processing unit, of the packet previously written to the second volatile memory;
- b) then, when said first volatile memory is written to, writing, by the processing circuit, of a next packet of the frame to said second volatile memory and simultaneous reading, by the processing unit, of the packet previously written to said first volatile memory; and
- c) then, when the second volatile memory is written to, perform at least one repetition of steps a) and b) for any following packets until said data have been completely transferred from the frame.

7. The method according to claim 3, wherein temporarily storing comprises, for a transfer of data from the second communication interface to the first communication interface for encapsulating these data in a frame:
- interrupt-free reading, by the processing circuit, of the data in successive packets alternately from the second volatile memory and from the first volatile memory, and
- when one of the first and second volatile memories has been read by the processing circuit, writing, by the processing unit, of a packet to this memory at a same time as the reading of content of the other volatile memory by the processing circuit.

8. The method according to claim 7, wherein temporarily storing further comprises:
- d) reading, by the processing circuit, of a packet of said data from the first volatile memory previously written by the processing unit and simultaneous writing, by the processing unit, of a next packet to the second memory previously read by the processing circuit;
- e) then, when said packet has been read by the processing circuit from the first volatile memory, reading, by the processing circuit, of said next packet from the second volatile memory and simultaneous writing, by the processing unit, of the packet following said next packet to the first volatile memory; and
- f) then, when the second volatile memory has been read, perform at least one repetition of steps d) and e) for any following packets until said data to be transmitted have been completely transferred into said frame.

9. The method according to claim 1, wherein the circular volatile memory of said first memory circuit comprises a write pointer and a read pointer.

10. The method according to claim 9, wherein the data received on the first communication interface are contained in at least one frame having a length greater than a memory capacity of the circular volatile memory, the method comprising, for each received frame, extracting by the processing circuit of the data on the fly, word by word.

11. The method according to claim 10, wherein temporarily storing comprises, for a transfer of data from the first communication interface to the second communication interface:
- writing, by the processing circuit, of the data in successive words to the circular volatile memory at a speed of the write pointer, and
- simultaneous reading, by the processing unit, at the speed of the read pointer, of the successive words previously written to the circular volatile memory,
- the read pointer travelling behind the write pointer.

12. The method according to claim 11, wherein temporarily storing further comprises, for a transfer of data from the second communication interface to the first communication interface, reading, by the processing circuit, of successive words of successive data from the circular volatile memory at the speed of the read pointer, each read word having been written beforehand by the processing unit at the speed of the write pointer as a replacement for a word previously read by the processing circuit.

13. The method according to claim 1, further comprising:
- in a second transfer mode, temporarily storing of the data in a second memory circuit accessible sequentially to the processing circuit and to said processing unit via said second communication interface.

14. The method according to claim 13, further comprising selection of the first or of the second transfer mode on command.

15. The method according to claim 1, wherein the first communication interface is an interface compatible with near-field communication.

16. The method according to claim 1, wherein the second communication interface is an SPI or I²C interface.

17. The method according to claim 1, wherein the first communication interface of the integrated circuit coupled to the antenna form a contactless transponder communicating with an external contactless communication apparatus in accordance with a contactless communication protocol.

18. A system, comprising:
an integrated circuit;
an antenna; and
a processing unit;
wherein the integrated circuit, comprises:
   a first contactless communication interface coupled to said antenna;
   a second communication interface configured to be coupled to the processing unit which is external to the integrated circuit;
   a processing circuit coupled to the first contactless communications interface; and
   a first memory circuit comprising a circular volatile memory, the first memory circuit being configured, in a first transfer mode, to transfer data from the first contactless communication interface to the second communication interface, and transfer data from the second communication interface to the first contactless communication interface, wherein the first transfer mode includes temporarily storing the transferred data in the first memory circuit, the first memory circuit being configured to be accessible simultaneously firstly to the processing circuit and secondly to said processing unit via said second communication interface; and
   circuitry for delivering to the second communication interface a first item of information and a second item of information that are intended for the processing unit, the first item of information indicating an amount of data available for reading in the circular volatile memory, and the second item of information signaling a risk of loss of data if the circular volatile memory is not read by the processing unit.

19. The integrated circuit according to claim 18, wherein the first memory circuit is accessible to the processing circuit at a first access rate and accessible to said processing unit at a second access rate, the second access rate being greater than or equal to the first access rate.

20. The integrated circuit according to claim 18, wherein said first memory circuit comprises at least a first volatile memory and a second volatile memory that are accessible either in read mode or in write mode.

21. The integrated circuit according to claim 20, wherein the data received on the first contactless communication interface are contained in at least one frame having a length greater than a memory capacity of each of the first and second volatile memories, and for each received frame, the processing circuit is configured to extract the data therefrom and segment the extracted data into successive packets.

22. The integrated circuit according to claim 21, wherein, for a transfer of data from the first contactless communication interface to the second communication interface:
the processing circuit is configured to perform interrupt-free writing of successive data packets of a frame alternately to the first volatile memory and to the second volatile memory, and
the second communication interface is configured to deliver, to the first memory circuit, read command signals emanating from the processing unit and deliver, to the processing unit, successive packets of the frame alternately read from the second volatile memory and from the first volatile memory, said delivery being simultaneous for at least some of the packets.

23. The integrated circuit according to claim 22, wherein:
a) the processing circuit is configured to read a packet of the frame from the first volatile memory and the second communication interface is configured to simultaneously deliver a read command to the second volatile memory emanating from the processing unit and deliver, to the processing unit, the packet of the frame previously written to the second volatile memory;
b) then, when said first memory is written to, the processing circuit is configured to write a next packet of the frame to said second volatile memory and the second communication interface is configured to simultaneously deliver a read command to the first volatile memory emanating from the processing unit and deliver, to the processing unit, the packet of the frame previously written to said first volatile memory; and
c) then, when the second volatile memory is written to, the processing circuit and the second communication interface are configured to perform at least one repetition of a) and b) for any following packets until said data have been completely transferred from said frame.

24. The integrated circuit according to claim 21, wherein, for a transfer of data from the second communication interface to the first contactless communication interface for encapsulating these data in a frame:
the processing circuit is configured to perform interrupt-free reading of the data of the frame in successive packets alternately from the second volatile memory and from the first volatile memory; and
when one of the first and second volatile memories has been read by the processing circuit, the second communication interface is configured to deliver a write command to this memory emanating from the processing unit and deliver, to this memory, a packet to be written emanating from the processing unit, the processing circuit being configured to simultaneously read content of the other volatile memory.

25. The integrated circuit according to claim 24, wherein:
d) the processing circuit is configured to read a packet of said data from the first volatile memory previously written by the processing unit via the second communication interface, and the second communication interface is configured to simultaneously deliver a write command to the second volatile memory previously read by the processing circuit and deliver, to this second memory, a next packet to be written emanating from the processing unit;
e) then, when said packet has been read by the processing circuit from the first volatile memory, the processing circuit is configured to read said next packet from the second volatile memory and the second communication interface is configured to simultaneously deliver a write command to the first volatile memory and deliver, to this first memory, the packet following said next packet and emanating from the processing unit; and
f) then, when the second volatile memory has been read, the processing circuit and the second communication interface are configured to perform at least one repetition d) and e) for any following packets until said data to be transmitted have been completely transferred into said frame.

26. The integrated circuit according to claim 18, wherein the circular volatile memory of said first memory circuit comprises a write pointer and a read pointer.

27. The integrated circuit according to claim 26, wherein the data received on the first contactless communication interface are contained in at least one frame having a length greater than a memory capacity of the circular volatile memory, and for each received frame, the processing circuit is configured to extract the data on the fly, word by word.

28. The integrated circuit according to claim 27, wherein, for a transfer of data from the first contactless communication interface to the second communication interface:
the processing circuit is configured to write the data in successive words to the circular volatile memory at a speed of the write pointer; and
the second communication interface is configured to simultaneously deliver read commands to the circular volatile memory and deliver, to the processing unit, at the speed of the read pointer, successive words previously written to the circular volatile memory,
the read pointer configured to travel behind the write pointer.

29. The integrated circuit according to claim 27, wherein, for a transfer of data from the second communication interface to the first contactless communication interface, the processing circuit is configured to read successive words of said data from the circular volatile memory at a speed of the read pointer, each read word having been beforehand written by the processing unit via said second communication interface at the speed of the write pointer as a replacement for a word previously read by the processing circuit.

30. The integrated circuit according to claim 18, comprising a second memory circuit configured, in a second transfer mode, to temporarily store data transferred between the first contactless communication interface and the second communication interface, the second memory circuit being configured to be accessible sequentially to the processing circuit and to said processing unit via said second communication interface.

31. The integrated circuit according to claim 30, further comprising circuitry for selecting the first or the second transfer mode on command.

32. The integrated circuit according to claim 18, wherein the first contactless communication interface is an interface compatible with near-field communication.

33. The integrated circuit according to claim 18, wherein the second communication interface is an SPI or I²C interface.

* * * * *